(12) United States Patent
Tsuboi et al.

(10) Patent No.: US 7,934,588 B2
(45) Date of Patent: May 3, 2011

(54) TORQUE DAMPER

(75) Inventors: Akira Tsuboi, Shizuoka (JP); Yoshihiko Ozawa, Shizuoka (JP); Yasutaka Amano, Shizuoka (JP); Hiromi Fujiwara, Shizuoka (JP); Ryo Mochizuki, Shizuoka (JP)

(73) Assignee: Kabushiki Kaisha F.C.C. (JP)

( * ) Notice: Subject to any disclaimer, the term of this patent is extended or adjusted under 35 U.S.C. 154(b) by 308 days.

(21) Appl. No.: 12/210,077

(22) Filed: Sep. 12, 2008

(65) Prior Publication Data

US 2009/0071786 A1    Mar. 19, 2009

(30) Foreign Application Priority Data

Sep. 12, 2007 (JP) ................. 2007-236490

(51) Int. Cl.
*F16H 45/02* (2006.01)
*F16F 15/123* (2006.01)
(52) U.S. Cl. ....... 192/3.29; 192/205; 192/212; 464/67.1
(58) Field of Classification Search .................. None
See application file for complete search history.

(56) References Cited

U.S. PATENT DOCUMENTS

| | | | |
|---|---|---|---|
| 5,772,515 A * | 6/1998 | Yamakawa et al. ........... | 464/68.3 |
| 5,899,311 A * | 5/1999 | Yamamoto et al. ........... | 192/205 |
| 6,290,042 B1 * | 9/2001 | Breier ........................... | 192/3.29 |
| 6,354,420 B1 * | 3/2002 | Yabe ............................. | 192/212 |

FOREIGN PATENT DOCUMENTS

| | | |
|---|---|---|
| JP | 09-126298 A | 5/1997 |
| JP | H10-061747 | 3/1998 |
| JP | H10-220555 | 8/1998 |
| JP | 2002-048218 | 2/2002 |
| JP | 2002-174321 | 6/2002 |

* cited by examiner

*Primary Examiner* — Richard M. Lorence
(74) *Attorney, Agent, or Firm* — Knobbe, Martens, Olson & Bear, LLP

(57) ABSTRACT

A torque damper can comprise a clutch piston arranged within a cover of a torque converter and can be adapted to be moved between a connected position and a non-connected position relative to the cover. Damper springs can be arranged along the circumference of the clutch piston. Connecting members can be arranged abutting against one end of the damper spring and adapted to connect a turbine arranged within the cover and the clutch piston via the damper spring. Damper holders can be arranged abutting against the other end of the damper spring and adapted to hold the damper spring against the compressive force applied to the damper spring from the connecting member. Guide sheets having wear resistance can be interposed between the circumference of the clutch piston and the damper spring and can be adapted to guide the damper spring. A torque input to the cover can be transmitted to the turbine via the clutch piston and the damper springs when the clutch piston is in the connected position. The guide sheets can be anchored to the damper holders and secured thereto immovably in the circumferential direction of the clutch piston.

14 Claims, 7 Drawing Sheets

[Fig 1]
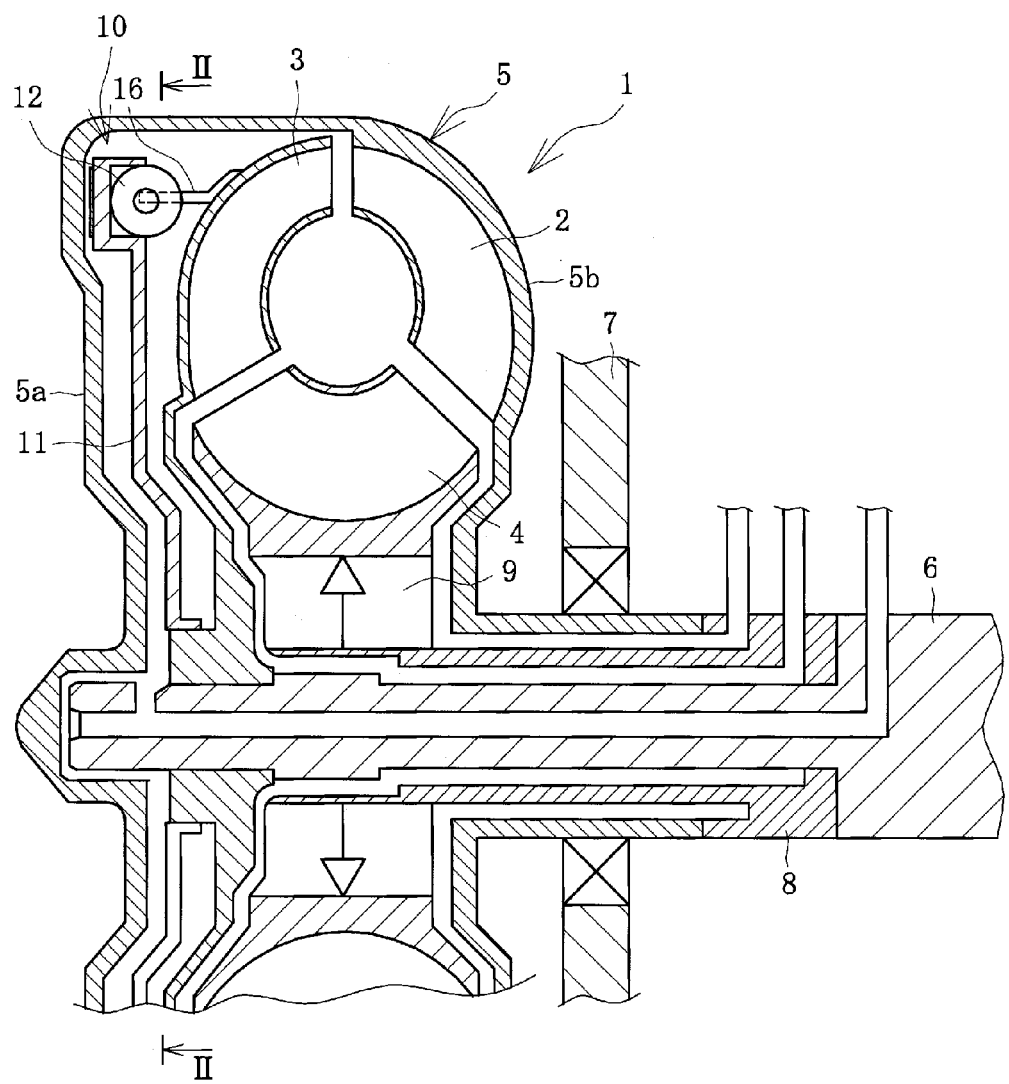

[Fig 2]
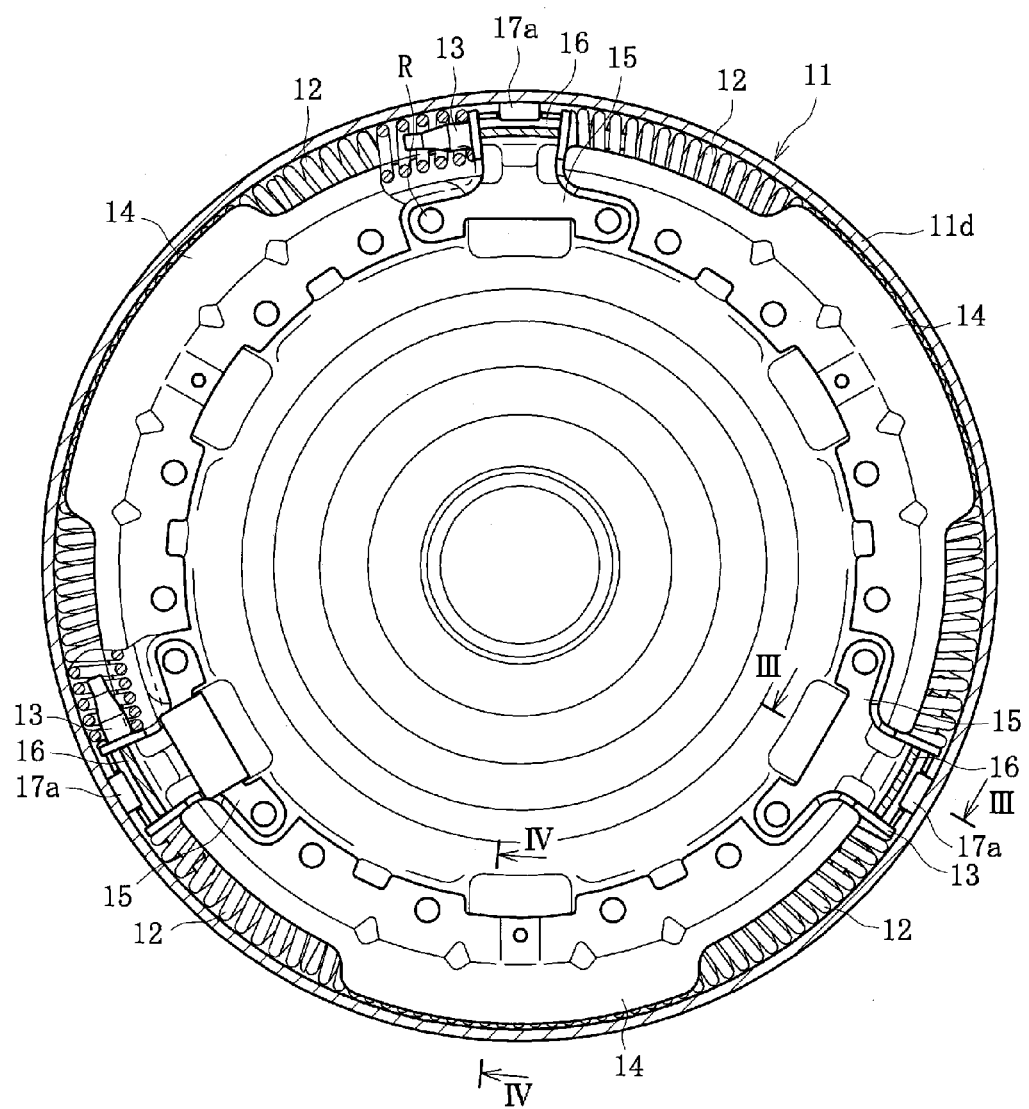

[ Fig 3 ]
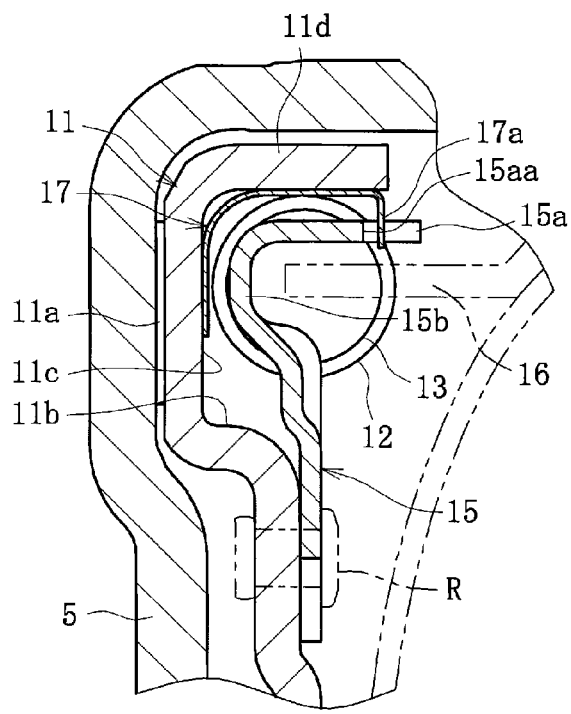
[ Fig 4 ]
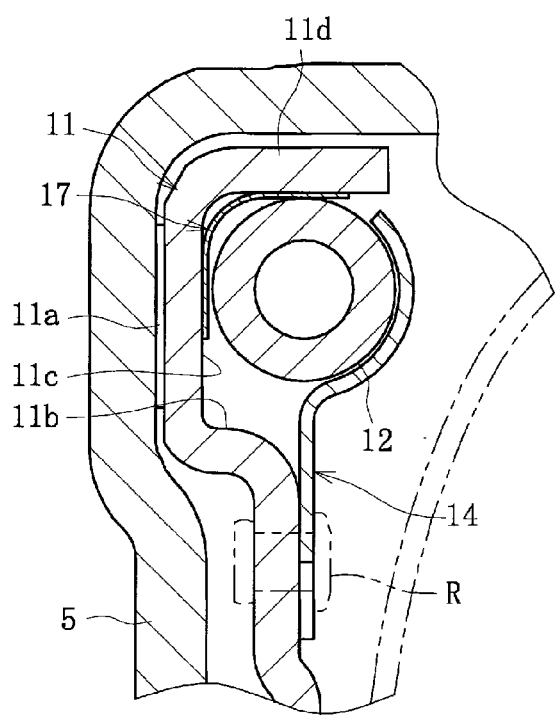

[Fig 5]
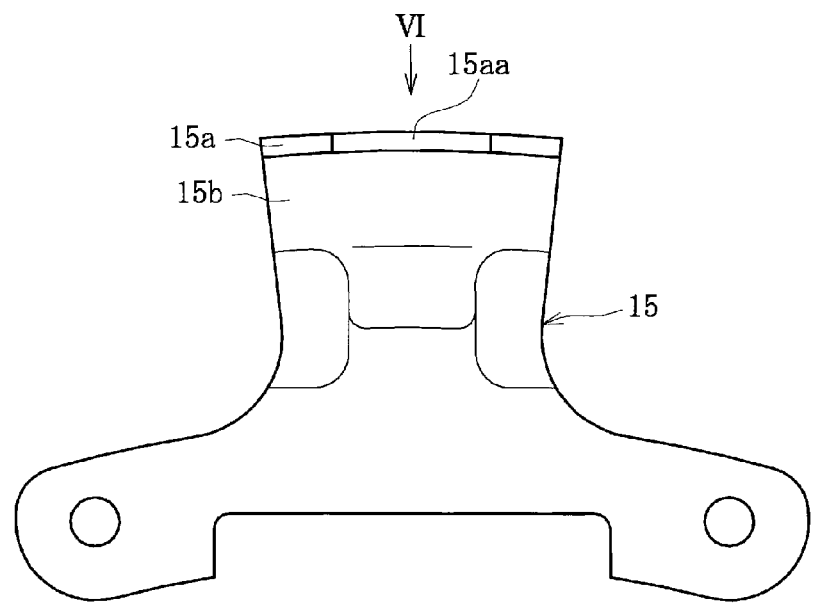
[Fig 6]
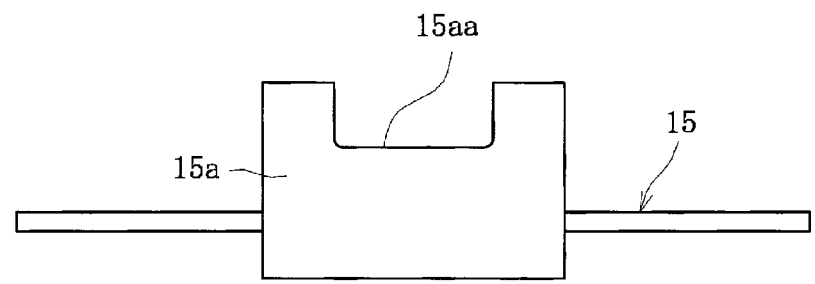

[Fig 7]
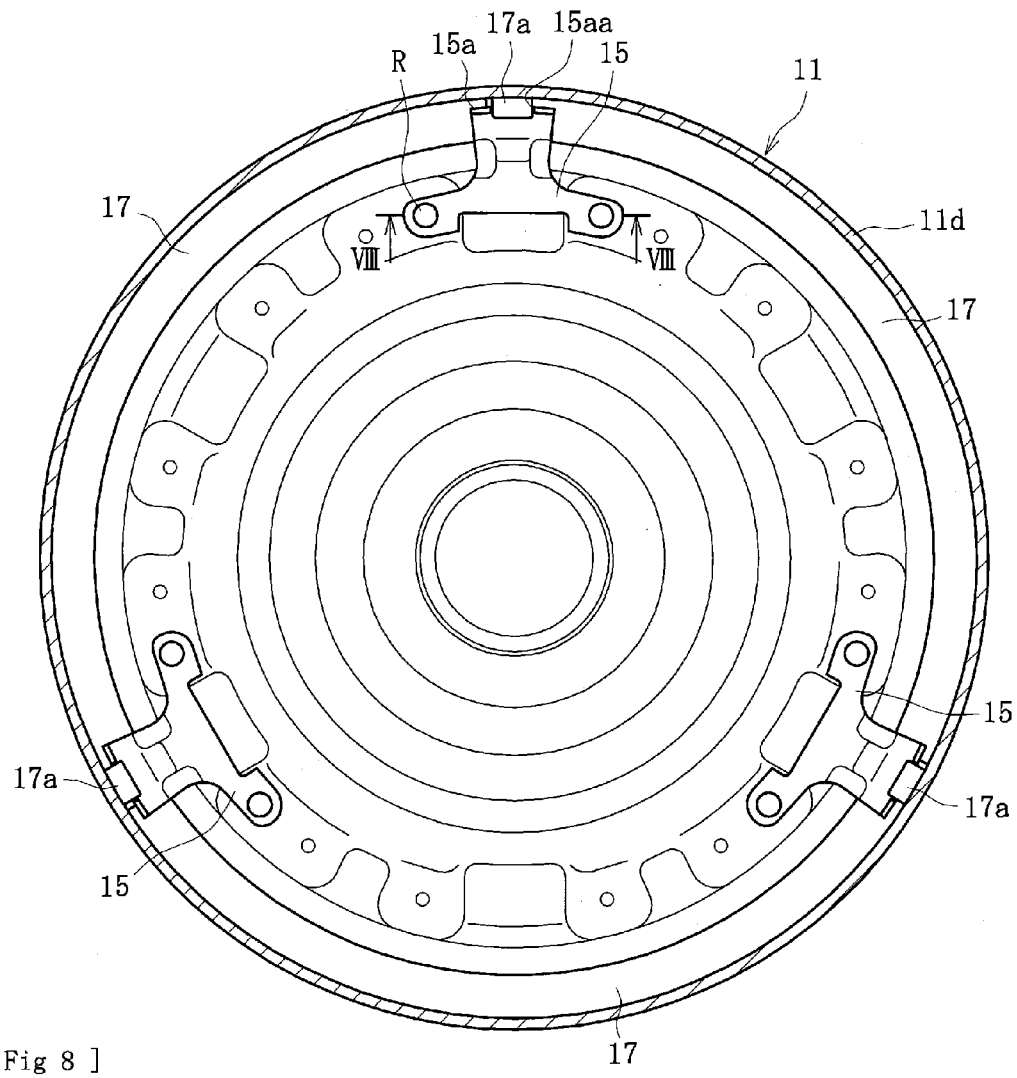
[Fig 8]
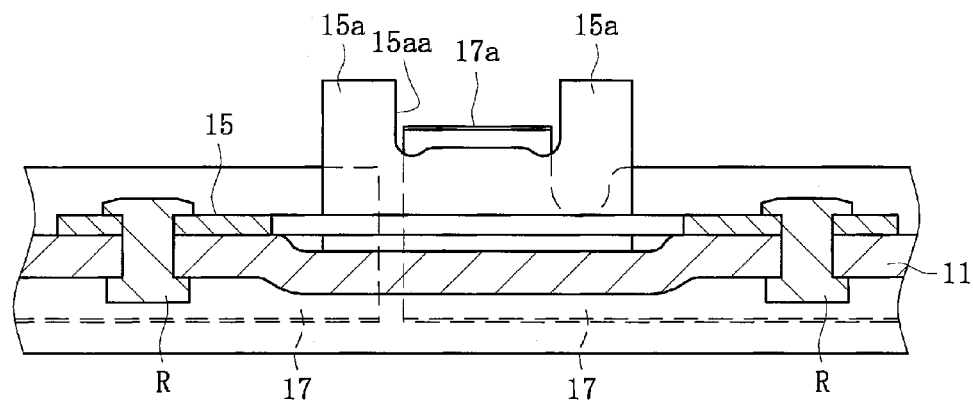

[Fig 9]
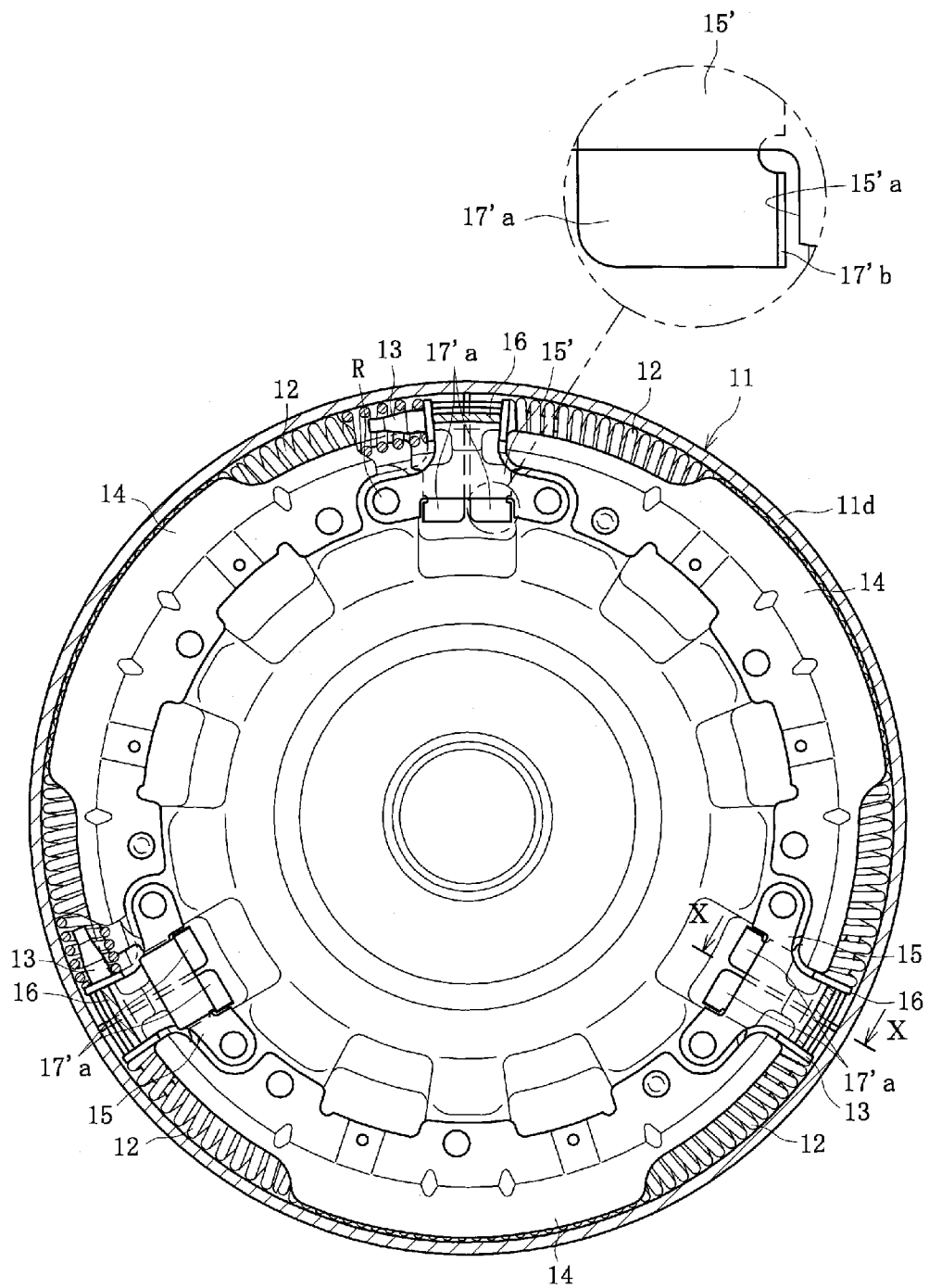

[ Fig 10 ]
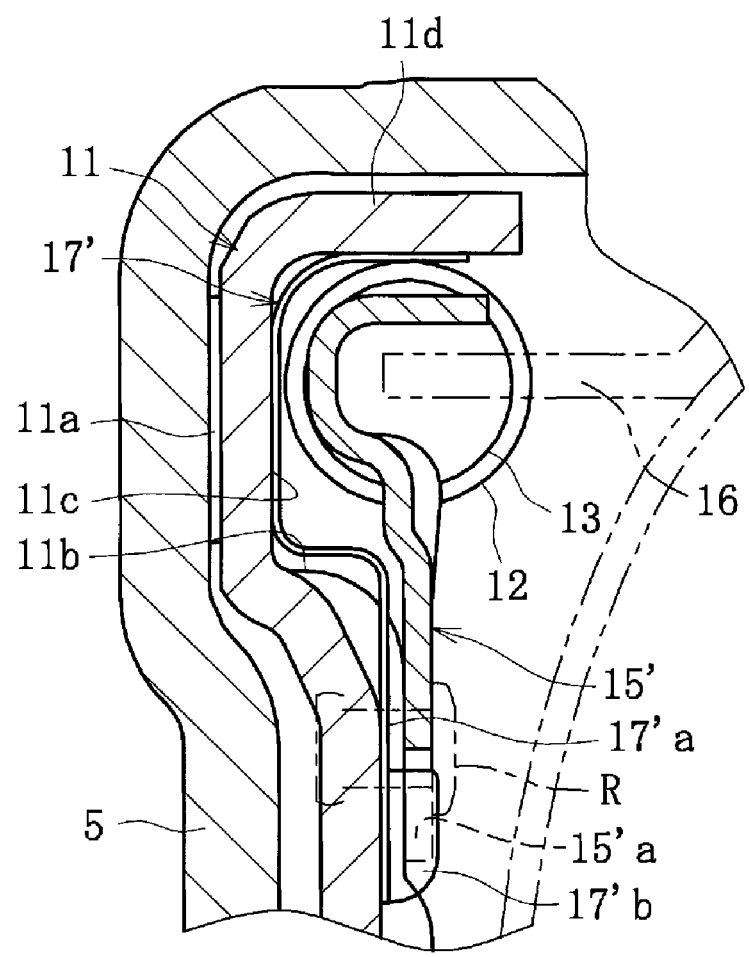

TORQUE DAMPER

PRIORITY INFORMATION

The present application is based on and claims priority under 35 U.S.C. §119(a-d) to Japanese Patent Application No. 2007-236490, filed on Sep. 12, 2007, the entire contents of which is expressly incorporated by reference herein.

BACKGROUND OF THE INVENTIONS

1. Field of the Inventions

The present inventions relate to torque dampers for transmitting torque input to a cover of a torque converter (hereinafter referred to as "a torque converter cover" or simply as "cover") to a turbine via a clutch piston and connecting members.

2. Description of the Related Art

A torque converter (fluid coupling) equipped on an AT (automatic transmission) vehicle usually comprises a torque converter cover in which liquid (working fluid) is contained in a substantially liquid-tight condition. A pump is typically rotated together with the torque converter cover, a turbine is arranged oppositely to the pump, a stator is connected to a one way clutch and the rotation of pump can be transmitted to the turbine via the liquid and can increase the transmitted torque. Accordingly the driving torque of engine can be boosted via the liquid and transmitted to a transmission and driving wheels of a vehicle.

A torque damper is sometimes included within the torque converter cover and is intended to reduce torque transmitting loss by directly connecting the torque converter cover and the turbine at an appropriate timing as compared with the torque transmission via liquid. This type of torque converter is often referred to as a "lockup torque converter". That is, the torque damper has a clutch piston adapted to be connected to the turbine and can be moved between a connected position in which the clutch piston is abutted against an inner circumferential wall of the torque converter cover and a non-connected position in which the clutch piston and the torque converter cover are separated and thus the torque converter cover and the turbine can be directly connected via the clutch piston at the connected position.

Damper springs are arranged on the clutch piston for absorbing torque variations from an engine in the connected condition of the torque damper. A plurality of the damper springs are arranged along the outer circumferential edge of the clutch piston in a circular arc arrangement and can be displaced (expanding and contracting) to absorb the torque variation transmitted from an engine when the clutch piston is in the connected position. For example, Japanese Laid-Open Patent Publication No. 126298/1997, discloses such a torque converter.

In the prior art disclosed in the Japanese Patent Document No. 126298/1997, guide sheets having wear resistance are arranged between the circumference of the clutch piston and the damper springs to reduce wear of the springs during their expansion and contraction. A portion of each guide sheet is anchored to the clutch piston to prevent the guide sheet from being moved circumferentially. More particularly, the guide sheet is anchored to the clutch piston by inserting a portion of the guide sheet folded radially outward of the clutch piston into a notch formed in a wall portion axially standing at the circumference of the clutch piston.

SUMMARY OF THE INVENTIONS

Aspects of at least one of the embodiments disclosed herein includes solutions to problems stemming from the clutch piston of a torque converter being formed with the notch for anchoring guide sheets. More particularly, the rigidity and accordingly the strength of the clutch piston during its rotation is substantially reduced due to the notch-anchored design described above.

Thus, in accordance with an embodiment, a torque damper can comprise a clutch piston arranged within a cover of a torque converter and adapted to be moved between a connected position and a non-connected position relative to the cover. Damper springs can be arranged along the circumference of the clutch piston. Connecting members can be arranged abutting against one end of the damper springs, respectively, and adapted to connect a turbine arranged within the cover and the clutch piston via the damper springs. Damper holders can be arranged abutting against the other end of the damper springs, respectively, and adapted to hold the damper springs against the compressive force applied to the damper springs from the connecting member. Guide sheets having wear resistance can be interposed between the circumference of the clutch piston and the damper springs, respectively, and can be adapted to guide the damper spring. Wherein a torque input to the cover is transmitted to the turbine via the clutch piston and the damper springs when the clutch piston is in a connected position. Additionally, the guide sheets can be anchored to the damper holders and secured thereto immovably in the circumferential direction of the clutch piston.

In accordance with another embodiment, a torque damper can comprise a clutch piston arranged within a cover of a torque converter and adapted to be moved between a connected position and a non-connected position relative to the cover. Damper springs can be arranged along the circumference of the clutch piston. Connecting members can be arranged abutting against one end of the damper springs, respectively, and adapted to connect a turbine arranged within the cover and the clutch piston via the damper springs. Damper holders can be arranged abutting against the other end of the damper springs, respectively, and adapted to hold the damper springs against the compressive force applied to the damper springs from the connecting member. Guide sheets having wear resistance can be interposed between the circumference of the clutch piston and the damper springs, respectively, and adapted to guide the damper spring. A torque input to the cover is transmitted to the turbine via the clutch piston and the damper springs when the clutch piston is in a connected position. Additionally, the torque damper can include means for anchoring the guide sheets to the damper holders so as to be immovable in a circumferential direction of the clutch piston.

BRIEF DESCRIPTION OF THE DRAWINGS

Additional advantages and features of the present inventions are apparent from the subsequent description and the appended claims, taken in conjunction with the accompanying drawings, wherein:

FIG. 1 is a cross-sectional view of the torque converter including a torque damper according to an embodiment;

FIG. 2 is a front elevation, sectional view taken along a line II-II of FIG. 1 showing the clutch piston of the torque damper;

FIG. 3 is a cross-sectional view taken along a line III-III of FIG. 2;

FIG. 4 is a cross-sectional view taken along a line IV-IV of FIG. 2;

FIG. 5 is a front elevation view showing the damper holder of the torque damper of FIG. 2;

FIG. 6 is a side elevation view of the damper holder of FIG. 5 taken from an arrow VI in FIG. 5;

FIG. 7 is a front elevation view of the torque damper of FIG. 1 in which the guide member and the damper spring are removed therefrom;

FIG. 8 is a cross-sectional view taken along a line VIII-VIII of FIG. 7;

FIG. 9 is a front elevation view showing the clutch piston of the torque damper of another embodiment; and FIG. 10 is a cross-sectional view taken along a line X-X of FIG. 9.

DETAILED DESCRIPTION OF THE PREFERRED EMBODIMENT

The embodiments of the torque damper disclosed herein can comprise a lockup clutch intended to transmit a torque input to a cover of a torque converter (i.e. a torque converter cover) to a turbine of the torque damper via a clutch piston and connecting members when the clutch piston is in the connected (or "locked") position. The torque converter (fluid coupling) 1 to which the present torque dampers are applied are described with reference to FIG. 1.

The torque converter 1 is usually equipped on an AT (automatic transmission) vehicle for transmitting a torque from an engine (not shown) to a transmission (not shown) and are usually configured to amplify the torque from the engine. Such a torque converter 1 can comprise a torque converter cover 5 rotatable about its axis to which engine torque and power are transmitted and within which liquid (working fluid) is filled in a liquid tight condition. A pump 2 is formed on a right-hand (in FIG. 1) wall 5b of the torque converter cover 5 and rotates together with the cover 5. A turbine 3 is arranged oppositely to the pump 2 at a side of left-hand (FIG. 1) wall 5a and is freely rotatable within the cover 5. A stator 4 is connected to a stator shaft 8 via a one-way clutch 9. Additionally, the torque converter 1 includes a lockup clutch 10.

When the torque converter cover 5 and the pump 2 are rotated by driving force from an engine, its rotational torque is transmitted to the turbine 3 via the liquid (working fluid). Additionally, the torque can be amplified due to the configuration of the pump 2 and the turbine 3. Accordingly when the turbine 3 is rotated by the amplified torque, an output shaft 6 connected to the turbine 3 via spline engagement is also rotated and thus the torque is transmitted to the transmission (not shown) of vehicle. In FIG. 1 a reference numeral 7 denotes a transmission case.

The lockup clutch 10 is intended to reduce loss of torque transmission as compared with the torque transmission using only liquid. Along these lines, the lockup clutch 10 directly connects the torque converter cover 5 and the turbine 3 at an appropriate timing, for example, during cruising at a steady speed and load.

As shown in FIGS. 2-8, the lockup clutch 10 can comprise a clutch piston 11 formed by a substantially disc shaped member, a plurality of damper springs 12 formed by circular arc shaped coil springs bent along their displacement directions (expanding and contracting directions), damper holders 15, and connecting members 16 for connecting the clutch piston 11 and the turbine 3.

The clutch piston 11 can be moved to left-hand and right-hand directions (FIG. 1) by switching the liquid pressure between the clutch piston 11 and the left-hand side wall 5a of the cover 5 respectively to negative and non-negative pressures.

The clutch piston 11 can be provided with a substantially annular lining 11a (FIGS. 3 and 4) on its outer circumferential surface at its left-hand side. Accordingly, when the liquid pressure between the clutch piston 11 and the left-hand side wall 5a of the cover 5 is changed to negative, the clutch piston 11 abuts to the inside surface of the left-hand side wall 5a of the torque converter cover 5 via the lining 11a and thus the clutch piston 11 and the torque converter cover 5 are connected each other (this position is referred to as a "connected position"). On the other hand, when the negative pressure is released, the clutch piston 11 is separated from the wall 5a of the cover 5 and thus the connection between the clutch piston 11 and the torque converter cover 5 is released (this position is referred to as a "non-connected position").

On a side of the clutch piston 11 opposite to the side on which the lining 11a is provided, there is formed a containing recess along its circumferential edge. The containing recess is formed as a circular arc groove for containing the damper spring 12. The containing recess can comprise, as shown in FIGS. 3 and 4, a stepped surface 11b formed by bending the outer circumferential edge of the clutch piston 11, a bottom wall portion 11c, and a wall portion 11d. That is, the wall portion 11d is a standing portion axially (i.e. toward the right-hand direction in FIGS. 3 and 4) standing up from the circumferential end of the clutch piston 11.

Guide sheets 17 can be members formed of thin sheet steel configured to provide wear resistance. The guide sheets 17 can be interposed between the circumferential edge (more particularly an inner circumferential surface of the bottom wall portion 11c and the wall portion 11d) of the clutch piston 11 and the damper springs 12 to guide the damper springs 12. The guide sheets 17 make it possible to suppress the wear of the damper springs 12 when the damper springs 12 slide along the circumference of the clutch piston 11 during expansion and contraction of the damper springs 12.

Accordingly, each spring 12 can be held with the radially outermost surface (top surface of the spring 12 in FIGS. 3 and 4) being limited by the wall portion 11d and the bottom side surface being limited by the bottom wall portion 11c. In addition, upward and radially inward movements of the damper spring 12 are limited by a guide member 14 (FIG. 4) secured on the front side of the clutch piston 11, and opposite ends of each damper spring 12 are provided with bearing members 13 to be abutted against connecting members 16.

Damper holders 15 (e.g. made of metal) each projected between the adjacent damper springs 12, can be secured to the clutch piston 11 to define a containing section for the adjacent damper springs 12. The damper holder 15 is abutted against the other end of the damper spring 12 via the bearing member 13 and can be adapted to be held against a compressive force applied to the damper spring 12 from the connecting member 16.

The damper holder 15 can be formed with a bent portion 15b bent toward the recess. The turbine 3 and the clutch piston 11 are connected each other in their rotational direction via the damper springs 12 with the tip end of each connecting member 16 extending from the turbine 3 being inserted into the bent portion 15b. That is, the side faces of each connecting member 16 inserted into the bent portion 15b is adapted to be abutted against the bearing member 13 of the damper springs 12 and thus it is possible that the torque variation is absorbed by displacement (i.e. expansion and contract) of the damper springs 12 while torque is transmitted from the clutch piston 11 to the turbine 3.

According to the above structure, one end of the damper spring 12 is arranged so that it abuts against the connecting member 16 via the bearing portion 13 so as to connect the turbine 3 and clutch piston 11 via the damper spring 12. On the other hand, the other end of the damper spring 12 is arranged so that it abuts against the damper holder 15 via the bearing portion 13 so as to hold the damper spring 12 against the compressive force applied to the damper spring 12 from the connecting member 16.

The damper holder 15 can be secured on the clutch piston 11 by rivets R and can comprise a standing portion 15a formed along the wall portion 11d of the clutch piston 11 and a notch 15aa formed in the standing portion 15a. The guide sheet 17 can include a nail portion 17a extending radially inward (downward in FIG. 3) and adapted to be anchored to the notch portion 15aa of the damper holder 15.

That is, the notch 15aa is formed in a tip end of the standing portion 15a of the damper holder 15 and the nail portion 17a of the guide sheet 17 is formed so that it extends toward the notch portion 15aa. Insertion of the nail portion 17a into the notch portion 15aa makes it possible to secure the guide sheet 17 relative to the circumferential direction of the clutch piston 11 with the guide sheet 17 being anchored to the damper holder 15.

According to the present embodiments, it is possible to eliminate any notch in the clutch piston 11 for engaging the guide sheet 17 and thus prevent the reduction of the rotational strength of the clutch piston 11 because of the guide sheet 17 being anchored to the damper holder 15 and secured immovably relative to the circumferential direction of the clutch piston 11. In addition, according to the present embodiments, since the notch 15aa is formed in the standing portion 15a of the damper holder 15, it is possible to make the nail portion 17a of the guide sheet 17 anchored to the notch 15aa without extending the nail portion 17a of the guide sheet 17 so long.

In operation, when the clutch piston 11 is shifted from its non-connected position to its connected position, the torque transmission path via liquid is switched to the direct mechanical torque transmission path for transmitting the torque inputted to the torque converter cover 5 to the turbine 3 via clutch piston 11 and the connecting member 16 of the lockup clutch 10. In this direct mechanical torque transmission, since it cannot be expected to absorb the engine torque variation by fluid, the engine torque variation can be absorbed by the damper springs 12.

That is, when torque variations arise during the torque transmission from the clutch piston 11 to the turbine 3 via the connecting members 16, the torque variation can be absorbed by the generation of relative displacement in the rotational direction between the connecting members 16 (i.e. the turbine 3) and the clutch piston 11 and by the compressive displacement (i.e. contraction) of the damper springs 12. The resulting torque is transmitted with less variations, such variations having been removed by the springs, to a transmission (not shown) from the turbine 3 via the output shaft 6.

According to the present embodiments, since the guide sheet 17 is anchored to the damper holder 15 and thus secured relative to the circumferential direction of the clutch piston 11, it is possible to prevent the damper spring 12 from being moved circumferentially of the clutch piston 11. Additionally, since the notch for engagement of the guide sheet can be eliminated from the clutch piston 11, it is possible to avoid reduction of the rotational strength of the clutch piston 11.

The present inventions have been described with reference to the preferred embodiment. Obviously, modifications and alternations will occur to those of ordinary skill in the art upon reading and understanding the preceding detailed description.

For example the lockup clutch 10 of FIGS. 1-8 may be modified. With reference to FIGS. 9 and 10, such a modified lockup clutch can comprise guide sheets 17' (formed of thin steel sheet having wear resistance at least its surface) for guiding the damper springs 12 interposed between the circumferential edge of the clutch piston 11 and the damper spring 12. Each guide sheet 17' is also anchored to the damper holder 15' and secured immovably relative to the circumferential direction of the clutch piston 11.

That is, the lockup clutch of FIGS. 9 and 10 comprises a tongue portion 17'a formed on the guide sheet 17' and extending radially inward (downward in FIG. 10) of the clutch piston 11, a standing portion 17'b standing in the axial direction (right-hand direction in FIG. 10) of the clutch piston 11 from the tongue portion 17'a, and an anchor portion 15'a (see an enlarged view in FIG. 9) formed on the damper holder 15' and adapted to be abutted against the standing portion 17'b. The guide sheet 17' can be anchored by abutting the standing portion 17'b formed on the tongue portion 17'a of the guide sheet 17' against the anchor portion 15'a of the damper holder 15'. Similarly to the embodiment of FIGS. 1-8, the structure of FIGS. 9 and 10 can also eliminate provision of the notch for anchoring the guide sheet on the clutch piston 11 and can more firmly perform the anchoring of the guide sheet 17'.

The guide sheets 17, 17' can be formed of any thin material other than a steel sheet, e.g. by a paper-like material having wear resistance at least at its surface. Similarly to the embodiments described above, since the guide sheets 17, 17' are formed of thin steel sheet having wear resistance at least at their surface, it is possible to suppress the wear of the damper springs 12 when the damper springs slide along the circumference of the clutch piston 11 during expansion and contraction of the damper springs.

The present inventions can be applied to any other torque damper with a guide sheet anchored on the damper holder and secured immovably relative to the circumferential direction of the clutch piston, even if it has a different outline configuration or additional functions than those illustrated and described in the specification and drawings.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A torque damper comprising:
    a clutch piston arranged within a cover of a torque converter and adapted to be moved between a connected position and a non-connected position relative to the cover;
    damper springs arranged along the circumference of the clutch piston;
    connecting members each arranged abutting against one end of at least one of the damper springs, respectively and adapted to connect a turbine arranged within the cover and the clutch piston via the damper springs;

a first damper holder arranged abutting against the other end of at least one of the damper springs, respectively, and adapted to hold at least one of the damper springs against the compressive force applied to the damper springs from the connecting member;
a second damper holder spaced apart from the first damper holder such that at least one of the damper springs extends between the first and second damper holders along an outer periphery of the clutch piston;
guide sheets having wear resistance and being interposed between the circumference of the clutch piston and the damper springs, respectively, and adapted to guide the damper spring;
wherein a torque input to the cover is transmitted to the turbine via the clutch piston and the damper springs when the clutch piston is in a connected position; and
wherein the guide sheets are anchored to the damper holders and secured thereto immovably in the circumferential direction of the clutch piston.

2. A torque damper comprising:
a clutch piston arranged within a cover of a torque converter and adapted to be moved between a connected position and a non-connected position relative to the cover;
damper springs arranged along the circumference of the clutch piston;
connecting members each arranged abutting against one end of the damper springs, respectively and adapted to connect a turbine arranged within the cover and the clutch piston via the damper springs;
damper holders arranged abutting against the other end of the damper springs, respectively, and adapted to hold the damper springs against the compressive force applied to the damper springs from the connecting member;
guide sheets having wear resistance and being interposed between the circumference of the clutch piston and the damper springs, respectively, and adapted to guide the damper spring;
a wall portion axially extending from an outer periphery of the clutch piston;
a standing portion formed in the damper holder and formed along the wall portion;
a notch formed in the standing portion;
a nail portion formed in the guide sheet and extending radially inward of the clutch piston so as to be anchored to the notch;
wherein a torque input to the cover is transmitted to the turbine via the clutch piston and the damper springs when the clutch piston is in a connected position; and
wherein the guide sheets are anchored to the damper holders and secured thereto immovably in the circumferential direction of the clutch piston.

3. A torque damper of claim 1 further comprising:
a clutch piston arranged within a cover of a torque converter and adapted to be moved between a connected position and a non-connected position relative to the cover;
damper springs arranged along the circumference of the clutch piston;
connecting members each arranged abutting against one end of the damper springs, respectively and adapted to connect a turbine arranged within the cover and the clutch piston via the damper springs;
damper holders arranged abutting against the other end of the damper springs, respectively, and adapted to hold the damper springs against the compressive force applied to the damper springs from the connecting member;
guide sheets having wear resistance and being interposed between the circumference of the clutch piston and the damper springs, respectively, and adapted to guide the damper spring;
a tongue portion formed on the guide sheet and extending radially inward relative to the clutch piston;
a standing portion extending axially relative to the clutch piston from the tongue portion;
an anchor portion formed on the damper holder and adapted to be anchored to the standing portion of the guide sheet and abutting against the standing portion;
wherein a torque input to the cover is transmitted to the turbine via the clutch piston and the damper springs when the clutch piston is in a connected position; and
wherein the guide sheets are anchored to the damper holders and secured thereto immovably in the circumferential direction of the clutch piston.

4. A torque damper of claim 2 wherein the guide sheets are formed of thin steel sheet having wear resistance at least at their surface.

5. A torque damper of claim 2 wherein the guide sheets are formed of thin steel sheet having wear resistance at least at their surface.

6. A torque damper of claim 3 wherein the guide sheets are formed of thin steel sheet having wear resistance at least at their surface.

7. A torque damper comprising:
a clutch piston arranged within a cover of a torque converter and adapted to be moved between a connected position and a non-connected position relative to the cover;
damper springs arranged along the circumference of the clutch piston;
connecting members each arranged abutting against one end of the damper springs, respectively and adapted to connect a turbine arranged within the cover and the clutch piston via the damper springs;
damper holders arranged abutting against the other end of the damper springs, respectively, and adapted to hold the damper springs against the compressive force applied to the damper springs from the connecting member;
guide sheets having wear resistance and being interposed between the circumference of the clutch piston and the damper springs, respectively, and adapted to guide the damper spring;
a wall portion axially extending from an outer periphery of the clutch piston;
a standing portion formed in the damper holder and formed along the wall portion;
a notch formed in the standing portion;
a nail portion formed in the guide sheet and extending radially inward of the clutch piston so as to be anchored to the notch;
wherein a torque input to the cover is transmitted to the turbine via the clutch piston and the damper springs when the clutch piston is in a connected position; and
means for anchoring the guide sheets to the damper holders so as to be immovable in a circumferential direction of the clutch piston.

8. A torque damper of claim 7, wherein the means for anchoring directly anchor the guide sheets to the damper holder without the use of a notch formed in the clutch piston.

9. A torque damper of claim 8 wherein the guide sheets are formed of thin steel sheet having wear resistance at least at their surface.

10. A torque damper of claim 7 wherein the guide sheets are formed of thin steel sheet having wear resistance at least at their surface.

11. A torque damper comprising:
   a clutch piston arranged within a cover of a torque converter and adapted to be moved between a connected position and a non-connected position relative to the cover;
   damper springs arranged along the circumference of the clutch piston;
   connecting members each arranged abutting against one end of the damper springs, respectively and adapted to connect a turbine arranged within the cover and the clutch piston via the damper springs;
   damper holders arranged abutting against the other end of the damper springs, respectively, and adapted to hold the damper springs against the compressive force applied to the damper springs from the connecting member;
   guide sheets having wear resistance and being interposed between the circumference of the clutch piston and the damper springs, respectively, and adapted to guide the damper spring;
   a tongue portion formed on the guide sheet and extending radially inward relative to the clutch piston;
   a standing portion extending axially relative to the clutch piston from the tongue portion;
   an anchor portion formed on the damper holder and adapted to be anchored to the standing portion of the guide sheet and abutting against the standing portion;
   wherein a torque input to the cover is transmitted to the turbine via the clutch piston and the damper springs when the clutch piston is in a connected position; and
   means for anchoring the guide sheets to the damper holders so as to be immovable in a circumferential direction of the clutch piston.

12. A torque damper of claim 11 wherein the means for anchoring directly anchor the guide sheets to the damper holder without the use of a notch formed in the clutch piston.

13. A torque damper of claim 11 wherein the guide sheets are formed of thin steel sheet having wear resistance at least at their surface.

14. A torque damper of claim 11 wherein the guide sheets are formed of thin steel sheet having wear resistance at least at their surface.

* * * * *

UNITED STATES PATENT AND TRADEMARK OFFICE
CERTIFICATE OF CORRECTION

| | | |
|---|---|---|
| PATENT NO. | : 7,934,588 B2 | Page 1 of 1 |
| APPLICATION NO. | : 12/210077 | |
| DATED | : May 3, 2011 | |
| INVENTOR(S) | : Tsuboi et al. | |

It is certified that error appears in the above-identified patent and that said Letters Patent is hereby corrected as shown below:

In the Claims

At column 7, line 53, after "damper" please delete "of claim 1 further".

Signed and Sealed this
Thirty-first Day of March, 2015

Michelle K. Lee
*Director of the United States Patent and Trademark Office*